(12) United States Patent
Ohgishi

(10) Patent No.: US 10,798,540 B2
(45) Date of Patent: Oct. 6, 2020

(54) INFORMATION APPARATUS, COMMUNICATION APPARATUS, AND COMMUNICATION METHOD FOR INFORMATION APPARATUS

(71) Applicant: Panasonic Intellectual Property Management Co., Ltd., Osaka (JP)

(72) Inventor: Kiyoshi Ohgishi, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/677,752

(22) Filed: Aug. 15, 2017

(65) Prior Publication Data

US 2018/0234789 A1 Aug. 16, 2018

(30) Foreign Application Priority Data

Feb. 14, 2017 (JP) ................................ 2017-025194
May 23, 2017 (JP) ................................ 2017-101360

(51) Int. Cl.

| | |
|---|---|
| *H04W 88/06* | (2009.01) |
| *H04W 4/38* | (2018.01) |
| *H04W 88/12* | (2009.01) |
| *H04W 4/80* | (2018.01) |
| *H04W 76/14* | (2018.01) |
| *H04W 84/12* | (2009.01) |
| *H04W 8/00* | (2009.01) |
| *H04W 48/16* | (2009.01) |

(52) U.S. Cl.
CPC ............... *H04W 4/38* (2018.02); *H04W 4/80* (2018.02); *H04W 88/12* (2013.01); *H04W 8/005* (2013.01); *H04W 48/16* (2013.01); *H04W 76/14* (2018.02); *H04W 84/12* (2013.01); *H04W 88/06* (2013.01)

(58) Field of Classification Search
CPC combination set(s) only.
See application file for complete search history.

(56) References Cited

U.S. PATENT DOCUMENTS

| | | | |
|---|---|---|---|
| 6,996,603 B1* | 2/2006 | Srinivasan | H04L 67/36 370/352 |
| 8,265,664 B1* | 9/2012 | Cenciarelli | H04M 1/72552 455/466 |
| 8,384,519 B2* | 2/2013 | Kuhl | G06K 7/0008 340/10.1 |
| 8,559,875 B2* | 10/2013 | Takayama | H04B 5/0031 455/41.2 |

(Continued)

FOREIGN PATENT DOCUMENTS

JP 2016-032280 A 3/2016

*Primary Examiner* — Edan Orgad
*Assistant Examiner* — Emmanuel K Maglo
(74) *Attorney, Agent, or Firm* — Renner, Otto, Boisselle & Sklar, LLP

(57) ABSTRACT

An information apparatus is capable of communicating with a communication apparatus via first communication and second communication. The information apparatus includes a controller and a communication unit. The controller creates connection-mode information necessary for causing the communication apparatus to set a network configuration via the second communication, according to a communication mode of the information apparatus. The communication unit transmits the connection-mode information to the communication apparatus via the first communication.

8 Claims, 8 Drawing Sheets

(56) References Cited

U.S. PATENT DOCUMENTS

| | | | | |
|---|---|---|---|---|
| 8,644,771 | B1* | 2/2014 | Delker | H04W 52/48 |
| | | | | 370/318 |
| 8,755,071 | B2* | 6/2014 | Terashita | G06F 3/1203 |
| | | | | 358/1.15 |
| 8,886,124 | B2* | 11/2014 | Ohira | H04M 1/72525 |
| | | | | 455/41.2 |
| 9,854,650 | B2* | 12/2017 | Kim | F21V 29/74 |
| 2014/0126911 | A1* | 5/2014 | Jovicic | H04B 10/1149 |
| | | | | 398/96 |
| 2014/0314184 | A1* | 10/2014 | Huang | H04L 27/2053 |
| | | | | 375/300 |
| 2014/0375428 | A1* | 12/2014 | Park | G06K 7/10237 |
| | | | | 340/10.1 |
| 2015/0038087 | A1* | 2/2015 | Park | H04W 76/14 |
| | | | | 455/41.3 |
| 2015/0334165 | A1* | 11/2015 | Arling | G06F 8/61 |
| | | | | 717/177 |
| 2015/0358804 | A1* | 12/2015 | Fransen | H04L 63/0414 |
| | | | | 370/329 |
| 2016/0350058 | A1* | 12/2016 | Zhu | G06F 3/1454 |
| 2017/0164214 | A1* | 6/2017 | Hara | H04B 17/318 |
| 2017/0202034 | A1* | 7/2017 | Paxinos | H04W 4/80 |
| 2017/0295422 | A1* | 10/2017 | Chalmers | G06F 3/165 |

\* cited by examiner

INFORMATION APPARATUS, COMMUNICATION APPARATUS, AND COMMUNICATION METHOD FOR INFORMATION APPARATUS

BACKGROUND

1. Technical Field

The present disclosure relates to a network device coordination technique for automatically establishing communication with a communication apparatus according to a communication mode of an information apparatus.

2. Description of the Related Art

A wireless local area network (LAN) utilizing a communication standard IEEE802.11 is widely used. In order to configure the wireless LAN network, it is necessary to set communication parameters in a communication apparatus. The communication parameters include a service set identifier (SSID), which is identification information of the wireless LAN, and information on security of the wireless LAN. PTL 1 discloses a method for setting communication parameters for wireless LAN communication.

CITATION LIST

Patent Literature

PTL 1: Unexamined Japanese Patent Publication 2016-32280

SUMMARY

An information apparatus according to the present disclosure is capable of communicating with a communication apparatus via first communication and second communication. The information apparatus includes a controller and a communication unit. The controller creates connection-mode information according to a communication mode of the information apparatus. The connection-mode information is necessary for causing the communication apparatus to set a network configuration via the second communication. The communication unit transmits the connection-mode information to the communication apparatus via the first communication.

A communication apparatus according to the present disclosure is capable of communicating with an information apparatus via first communication and second communication. The communication apparatus includes a communication unit and a control unit. The communication unit receives connection-mode information from the information apparatus via the first communication. The connection-mode information is necessary for setting a network configuration via the second communication. The control unit starts the second communication with the information apparatus according to the connection-mode information that the communication unit receives.

A communication method for a communication apparatus according to the present disclosure is capable of communicating with an information apparatus via first communication and second communication. The communication method includes: activating the communication apparatus when the communication apparatus receives an activation signal from the information apparatus via the first communication; and causing the communication apparatus to select to act as an access point or a station, and to perform the second communication with the information apparatus.

The information apparatus according to the present disclosure is effective for causing the communication apparatus to set a required network configuration according to the connection-mode information, and automatically establishing communication with the communication apparatus.

The communication apparatus according to the present disclosure is effective for setting a network configuration according to the connection-mode information, and automatically establishing communication with the information apparatus.

The communication method for a communication apparatus according to the present disclosure is effective for the communication apparatus to set a network configuration according to the connection-mode information and to automatically establish communication with the information apparatus.

DETAILED DESCRIPTION

Hereinafter, exemplary embodiments will be described in detail with reference to the drawings appropriately. However, descriptions in more detail than necessary may be omitted. For example, a detailed description of a matter which is already well-known, or an overlapped description for a substantially identical configuration may be omitted. This is intended to prevent the following description from becoming unnecessarily redundant and to facilitate understanding by a person skilled in the art.

First Exemplary Embodiment

Figure 1:
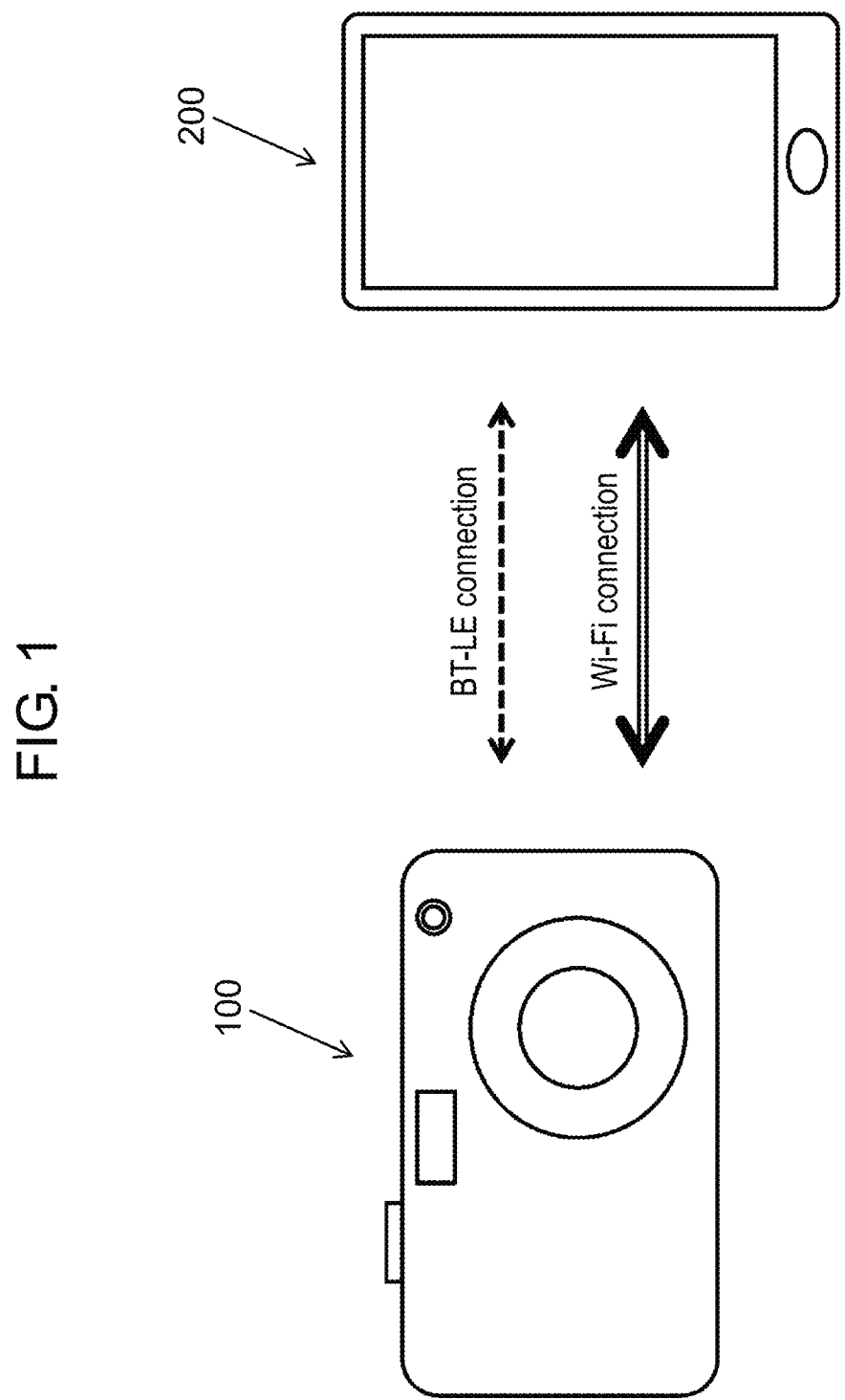
FIG. 1 is a diagram illustrating an example of a connection mode between a digital camera and a smartphone according to a first exemplary embodiment.

In a first exemplary embodiment, a network configuration of a communication apparatus can be automatically set according to various communication modes of an information apparatus. Therefore, a coordination operation between the information apparatus and the communication apparatus can be smoothly performed. Specifically, in the first exemplary embodiment, a smartphone is described as an example of the information apparatus and a digital camera is described as an example of the communication apparatus. In the first exemplary embodiment, for example, when the digital camera is activated according to an activation signal from the smartphone, the digital camera is automatically connected to a network for communication with greater communication capacity (for example, Wi-Fi communication) according to various communication modes of the smartphone. Thus, the digital camera can communicate with the smartphone. Thus, a user can reproduce or process image data captured with the digital camera, or upload the image data to the network, by using the smartphone. Alternatively, when the user captures an image with the digital camera, the user can perform a remote operation of the digital camera such as zooming and focusing, by using the smartphone. Hereinafter, the first exemplary embodiment will be described with reference to FIGS. 1 to 7. FIG. 1 is a diagram illustrating an example of a connection mode between digital camera 100 (communication apparatus) and smartphone 200 (information apparatus) according to the first exemplary embodiment.

Smartphone 200 according to the first exemplary embodiment transmits a wakeup signal (activation signal) to digital camera 100 through first communication (for example, Bluetooth (registered trademark, the same applies hereinafter) Low Energy (BT-LE) communication), and automatically activates digital camera 100. Then, smartphone 200 transmits connection information to digital camera 100 through the first communication. The connection information is created according to a communication mode of smartphone 200. Digital camera 100 determines a network configuration according to the connection information, and starts second communication (for example, Wi-Fi communication). Thus, smartphone 200 can cause digital camera 100 to set a required network configuration.

Hereinafter, configurations and operation of digital camera 100 and smartphone 200 according to the first exemplary embodiment will be described.

1. Configuration

The configurations of digital camera 100 and smartphone 200 according to the first exemplary embodiment will be described below with reference to the drawings.

1-1. Configuration of Digital Camera

Figure 2:
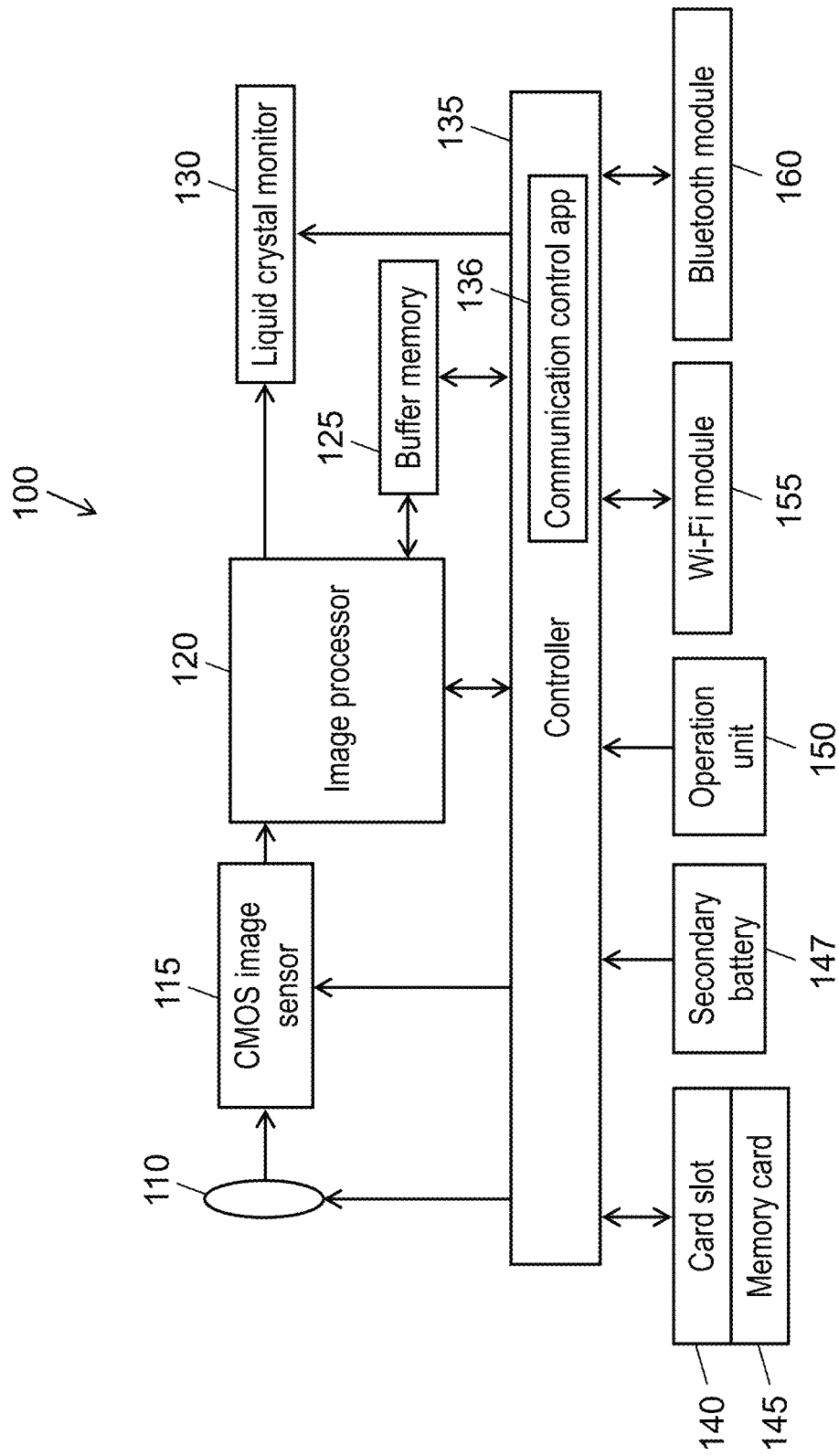
FIG. 2 is an electrical configuration diagram of the digital camera.

FIG. 2 is an electrical configuration diagram of digital camera 100. Digital camera 100 captures a subject image formed via optical system 110 by means of complementary metal-oxide semiconductor (CMOS) image sensor 115. CMOS image sensor 115 creates imaging data (raw data) based on the captured subject image. Image processor 120 applies various processes to the imaging data created by imaging and creates image data. Controller 135 records the image data created by image processor 120 in memory card 145 inserted into card slot 140. In addition, controller 135 can receive an operation of operation unit 150 performed by a user, and display (reproduce) the image data recorded in memory card 145 on liquid crystal monitor 130.

Optical system 110 includes a focus lens, a zoom lens, an optical camera-shake correction lens (or an optical image stabilizer (OIS)), an aperture, a shutter, and the like. Optical system 110 includes any number of various lenses. In addition, optical system 110 may be configured with a plurality of units each of which is configured with a plurality of the lenses.

CMOS image sensor 115 captures a subject image formed via optical system 110 and creates imaging data. CMOS image sensor 115 creates image data of a new frame at a predetermined frame rate (for example, 30 frames/sec.). Controller 135 controls an imaging data creation timing and electronic shutter operation in CMOS image sensor 115. Note that digital camera 100 according to the first exemplary embodiment is equipped with the CMOS image sensor as an imaging element. However, the imaging element is not limited to the CMOS image sensor. Another image sensor may be used as the imaging element. Examples of the other image sensor include a charge coupled device (CCD) image sensor and an n-channel metal-oxide semiconductor (NMOS) image sensor.

Image processor 120 applies various processes to the imaging data output from CMOS image sensor 115 and creates image data. In addition, image processor 120 applies various processes to the image data read from memory card 145, and creates an image to be displayed on liquid crystal monitor 130. Examples of the various processes include a white balance correction, a gamma correction, a YC conversion process, an electronic zoom process, a compression process, and an expansion process; however, the various processes are not limited to them. Image processor 120 may be configured with a hard-wired electronic circuit, a microcomputer using a program, or the like.

Liquid crystal monitor 130 is provided on a back of digital camera 100. Liquid crystal monitor 130 displays an image based on the image data processed by image processor 120. Note that the liquid crystal monitor is an example of a display device and another monitor such as an organic electro-luminescence (EL) monitor may be used as the display device.

Controller 135 integrally controls operation of entire digital camera 100. Controller 135 may be configured with a hard-wired electronic circuit, a microcomputer, or the like. In addition, controller 135, image processor 120, and the like may be configured with one semiconductor chip. In addition, controller 135 includes a read only memory (ROM) in an inside of controller 135. The ROM stores a service set identifier (SSID) necessary for establishing Wi-Fi communication with another communication device, and a Wi-Fi protected access (WPA) key serving as a password. Controller 135 can read the SSID and the WPA key from the ROM as necessary. In addition, the ROM stores a program for integrally controlling the operation of entire digital camera 100 in addition to a program regarding autofocus control (AF control), and a program regarding communication control (that is, embedded communication control app 136 which controls the BT-LE communication and the Wi-Fi communication).

Buffer memory 125 is a recording medium functioning as a work memory of image processor 120 and controller 135. Buffer memory 125 is realized by a dynamic random access memory (DRAM) or the like.

Card slot 140 is a connecting unit capable of detachably accepting memory card 145. Memory card 145 can be electrically and mechanically connected to card slot 140. Memory card 145 is an external memory including a recording element such as a flash memory in an inside of memory card 145. Memory card 145 can store data such as image data created by image processor 120.

Secondary battery 147 is a rechargeable battery for supplying electric power to digital camera 100. For example, in digital camera 100, secondary battery 147 is configured with a lithium-ion battery.

Operation unit 150 is a general term for hard keys such as an operation button and an operation lever provided on an exterior of digital camera 100, and receives an operation performed by a user. When operation unit 150 receives the operation performed by the user, operation unit 150 informs controller 135 of various operation instruction signals.

Wi-Fi module 155 is a communication module performing communication in compliance with a communication standard IEEE802.11. Digital camera 100 can communicate with another communication device equipped with a Wi-Fi module via Wi-Fi module 155. Digital camera 100 may directly communicate with another communication device via Wi-Fi module 155 or may communicate with another communication device via an access point.

Bluetooth module 160 (communication unit) is a communication module which performs communication in compliance with a communication standard 802.15.1, that is, Bluetooth. Bluetooth module 160 enables communication in a range of several meters or more at a relatively high communication bit rate. In the present exemplary embodiment, Bluetooth module 160 supports version 4.0, which has a power saving function called BLE (Bluetooth Low Energy) and is suitable for long-time use, and Class 1, which has a long radio range and enables radio waves to reach throughout a house.

1-2. Configuration of Smartphone

Figure 3:
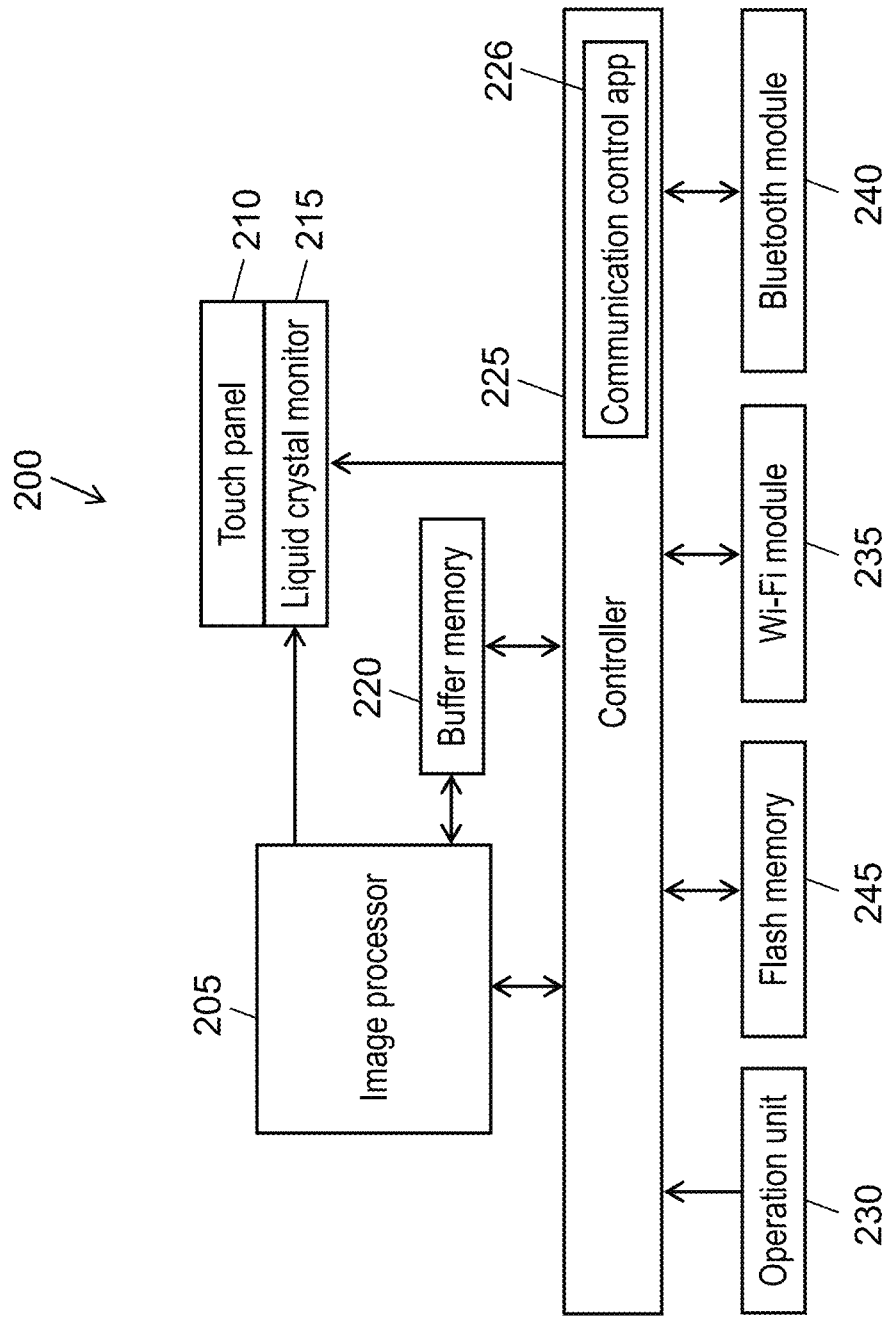
FIG. 3 is an electrical configuration diagram of the smartphone.

FIG. 3 is an electrical configuration diagram of smartphone 200. Smartphone 200 can display an image indicated by image data created in image processor 205, on liquid crystal monitor 215. Touch panel 210 is disposed on a surface of liquid crystal monitor 215, and can receive a touch operation performed by a user. In addition, smartphone 200 includes operation unit 230. An operation other than an operation through touch panel 210 can be performed on operation unit 230. Controller 225 can communicate with another communication device via Wi-Fi module 235 or Bluetooth module 240.

Image processor 205 applies various processes to image data read from flash memory 245, and creates an image to be displayed on liquid crystal monitor 215. An example of the various processes is an expansion process; however, the various processes are not limited to the expansion process. Image processor 205 may be configured with a hard-wired electronic circuit, a microcomputer using a program, or the like.

Touch panel 210 is an input device which detects contact of a finger or the like of a user and outputs operation information to controller 225. Touch panel 210 is disposed on the surface of liquid crystal monitor 215. Touch panel 210 may be a resistance film type or an electrostatic capacitance type touch panel, or a touch panel of another type.

Liquid crystal monitor 215 is a display device which displays a screen specified by controller 225.

Buffer memory 220 is a memory temporarily storing information necessary for controller 225 to execute operation of various processes. Controller 225 controls operation of each unit configuring smartphone 200. Controller 225 is electrically connected to image processor 205, touch panel 210, liquid crystal monitor 215, buffer memory 220, operation unit 230, flash memory 245, Wi-Fi module 235, and Bluetooth module 240. Controller 225 may be configured with a hard-wired electronic circuit, a microcomputer, or the like. In addition, controller 225, image processor 205, and the like may be configured with one semiconductor chip. In addition, controller 225 includes a ROM in an inside of controller 225. The ROM stores an SSID and a WPA key necessary for establishing Wi-Fi communication with another communication device. Controller 225 can read the SSID and the WPA key from the ROM as necessary. In addition, the ROM stores a program for integrally controlling the entire operation of smartphone 200 in addition to a program regarding communication control, and communication control app 226 which controls BT-LE communication and Wi-Fi communication. Communication control app 226 is installed in the ROM after purchase of smartphone 200.

Wi-Fi module 235 is a communication module which performs communication in compliance with the communication standard IEEE802.11. Smartphone 200 can communicate with another communication device equipped with a Wi-Fi module, via Wi-Fi module 235. Smartphone 200 may directly communicate with another communication device via Wi-Fi module 235 or may communicate with another communication device via an access point.

Bluetooth module 240 (communication unit) is a communication module which performs communication in compliance with the communication standard 802.15.1, that is, Bluetooth. Bluetooth module 240 enables communication in a range of several meters or more at a relatively high communication bit rate. In the present exemplary embodiment, Bluetooth module 240 supports version 4.0, which has the power saving function called BLE (Bluetooth Low Energy) and is suitable for long-time use, and Class 1, which has a long radio range and enables radio waves to reach throughout a house.

Flash memory (hereinafter simply referred to as "memory") 245 stores image data and the like captured by smartphone 200.

Note that smartphone 200 may include a phone function, an Internet communication function, and a camera function.

2. Operation

Figure 4:
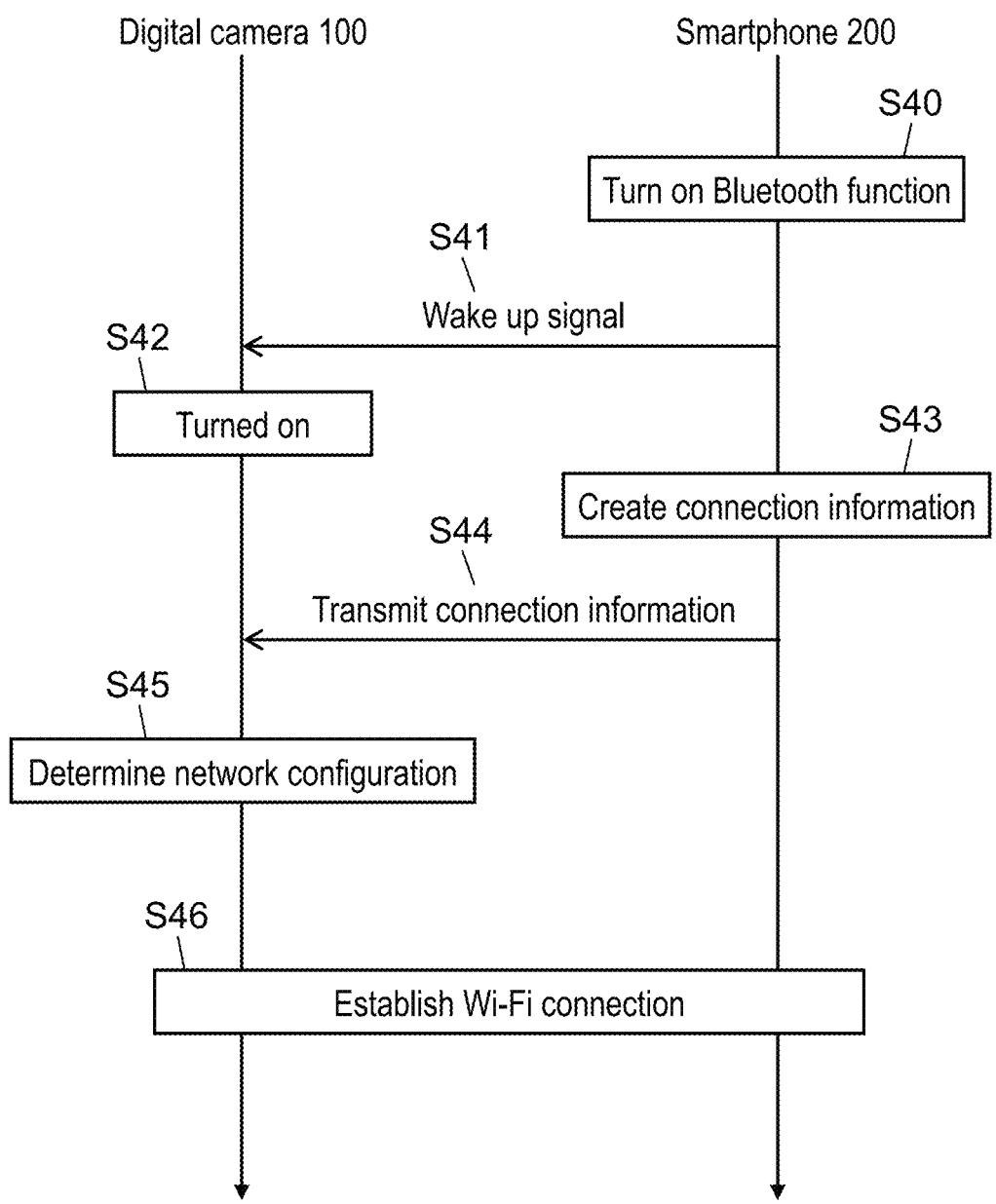
FIG. 4 is a sequence diagram illustrating communication operation between the smartphone and the digital camera.

FIG. 4 is a sequence diagram illustrating Wi-Fi connection operation between the smartphone and the digital camera.

Operation of establishing Wi-Fi connection between smartphone 200 and digital camera 100 will be described below with reference to FIG. 4. In the operation, smartphone 200 causes digital camera 100 to set a required network configuration.

First, a user of smartphone 200 turns on a Bluetooth function of smartphone 200 (step S40).

Next, in step S41, in order to activate digital camera 100 according to an instruction from the user, controller 225 of smartphone 200 uses Bluetooth module 160 of smartphone 200 to transmit a wakeup signal to digital camera 100. When digital camera 100 receives the wakeup signal, digital camera 100 is turned on and is automatically activated (step S42).

Figure 5:
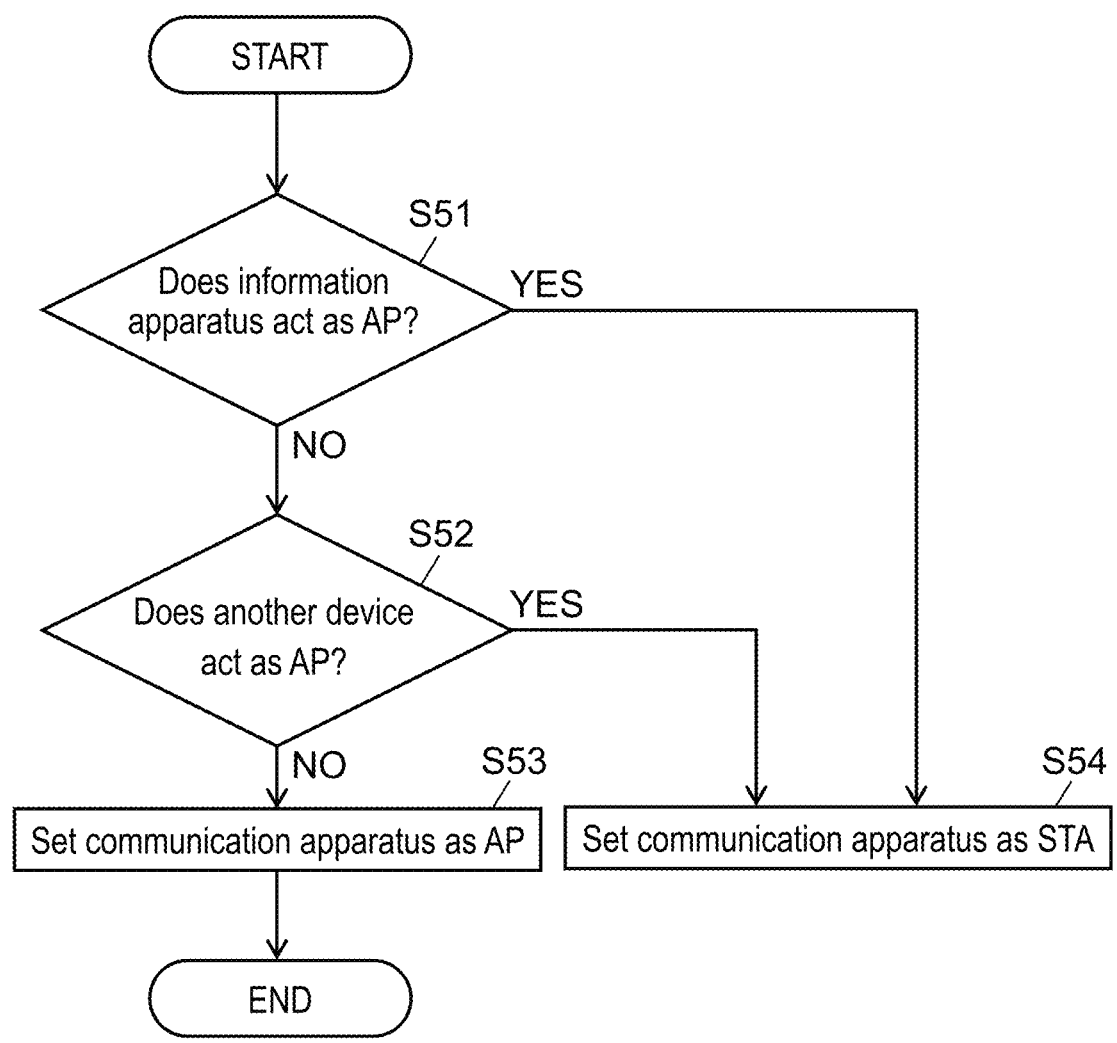
FIG. 5 is a flowchart illustrating operation of creating connection-mode information according to a communication mode of the smartphone.

Next, in step S43, smartphone 200 creates connection information (connection-mode information and connection identification (ID)) according to a communication mode of smartphone 200. FIG. 5 is a flowchart illustrating operation of creating the connection-mode information according to the communication mode of the smartphone. Communication control app 226 of controller 225 of smartphone 200 enables processes in FIG. 5.

In step S51 in FIG. 5, controller 225 checks whether or not smartphone 200 acts as an access point (AP). When controller 225 judges that smartphone 200 acts as an AP (Yes in step S51), controller 225 sets digital camera 100, which is a communication counterpart, as a station (STA) (step S54). This case falls under case (c) of FIG. 6, and is a state where smartphone 200 operates in a tethering mode.

When controller 225 judges in step S51 that smartphone 200 does not act as an AP (access point) (No in step S51), a process transitions to step S52. In step S52, controller 225 checks whether or not another device acts as an AP. When controller 225 judges that another device acts as an AP (Yes in step S52), controller 225 sets digital camera 100, which is the communication counterpart, as an STA (station) (step S54). This case falls under case (b) of FIG. 6, and is a state where smartphone 200 is connected to Wi-Fi wireless AP 300. When controller 225 judges in step S52 that no other device acts as an AP (No in step S52), controller 225 sets digital camera 100, which is the communication counterpart, as an AP (step S53). This case falls under case (a) of FIG. 6, and is a state where smartphone 200 does not use Wi-Fi.

Figure 7:
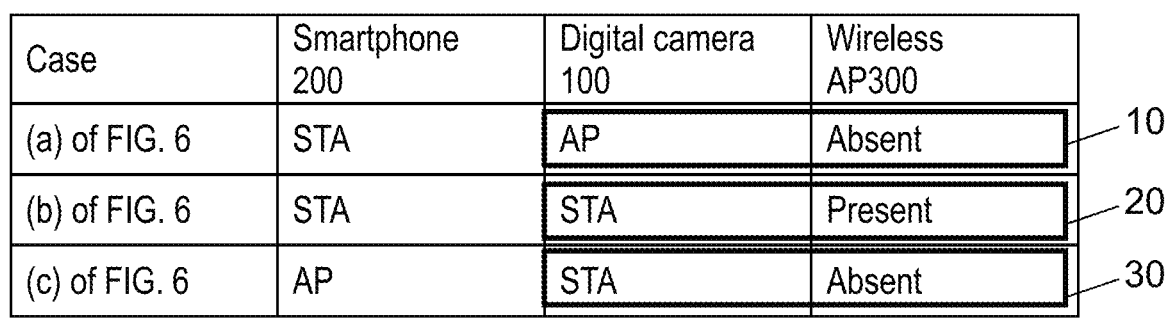
FIG. 7 is a diagram illustrating an example of the connection-mode information.

Through the above operation, the connection-mode information illustrated in FIG. 7 can be obtained.

Returning to FIG. 4, in step S44, smartphone 200 uses Bluetooth module 160 to transmit connection information to digital camera 100. Here, the connection information includes connection ID (SSID) necessary for establishing second communication, and the connection-mode information necessary for causing digital camera 100 to set a network configuration. Note that in a case where digital camera 100 acts as an AP, the connection information may not include the connection ID. The connection-mode information is information of a pair of digital camera 100 and wireless AP 300 illustrated in FIG. 7. For example, in a case where a communication mode of the smartphone before Wi-Fi connection is established is case (a) of FIG. 6, connection-mode information 10 indicates that digital camera 100 is an AP, and wireless AP 300 does not exist. In a case where a communication mode of the smartphone before the Wi-Fi connection is established is case (b) of FIG. 6, connection-mode information 20 indicates that digital camera 100 is an STA, and wireless AP 300 exists. In a case where a communication mode of the smartphone before the Wi-Fi connection is established is case (c) of FIG. 6, connection-mode information 30 indicates that digital camera 100 is an STA, and wireless AP 300 does not exist. Note that information indicating whether smartphone 200 is an AP or a STA may be added to the connection-mode information, as illustrated in FIG. 7.

Then, in step S45, controller 135 of digital camera 100 reads the received connection-mode information and determines a network configuration to be set by digital camera 100.

In step S46, controller 135 of digital camera 100 uses an SSID and a WPA key to cause digital camera 100 to establish the Wi-Fi connection with smartphone 200 or wireless AP 300 other than smartphone 200 such that the network configuration determined in step S45 is formed.

Note that in the present exemplary embodiment, assume that digital camera 100 was once connected to Wi-Fi before a sequence illustrated in FIG. 4 is started, and digital camera 100 has already obtained the WPA key necessary for establishing Wi-Fi communication from smartphone 200, and stores the WPA key in the ROM of digital camera 100.

In addition, assume that digital camera 100 has a history of the Wi-Fi connection with wireless AP 300 and the SSID and the WPA key necessary for establishing the Wi-Fi connection with wireless AP 300 other than smartphone 200 are stored in the ROM.

Figure 8:
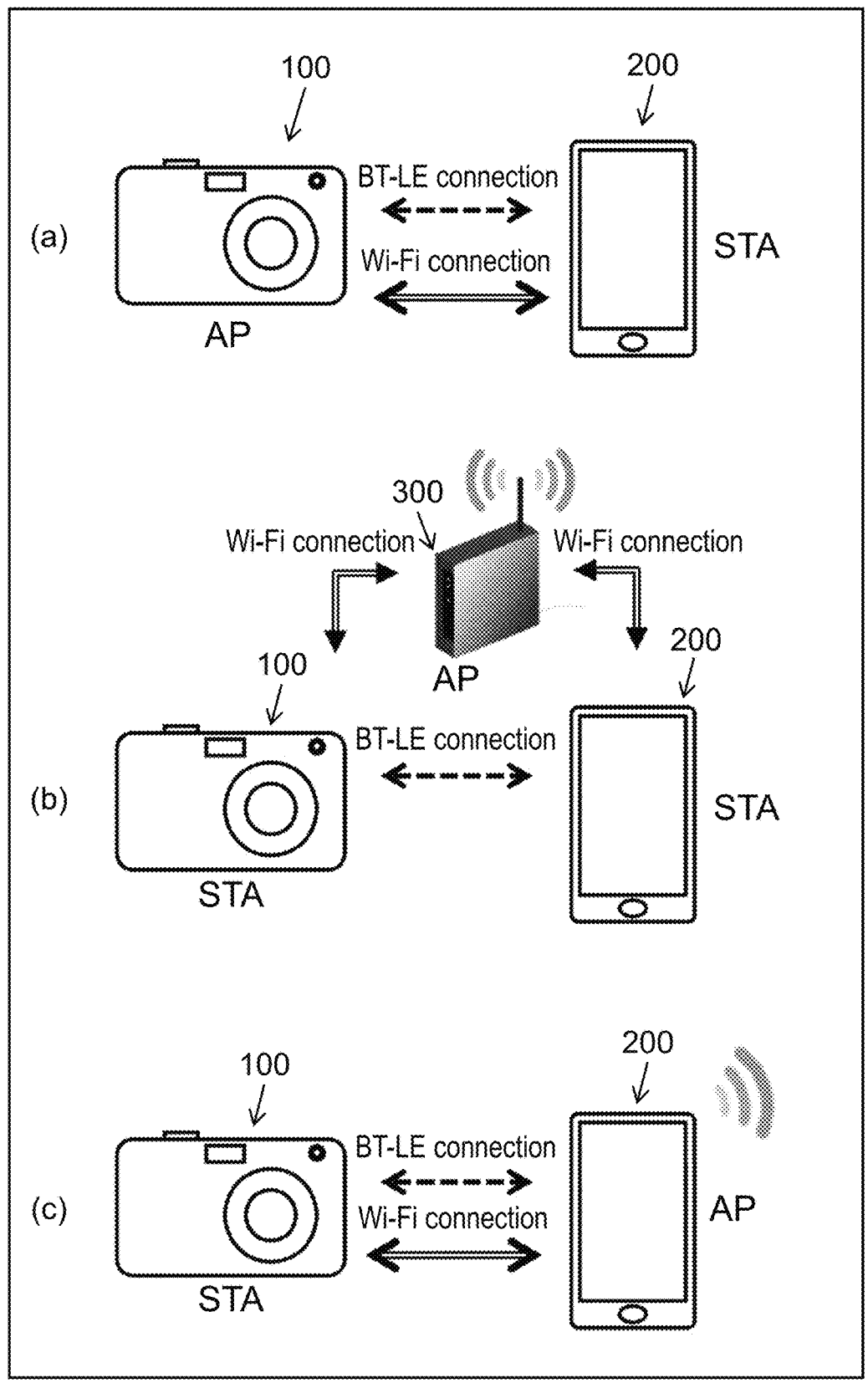
FIG. 8 is a diagram illustrating a network configuration after the digital camera establishes Wi-Fi connection.

FIG. 8 is a diagram illustrating a network configuration after the digital camera establishes the Wi-Fi connection. Case (a) of FIG. 6 before the Wi-Fi connection transitions to case (a) of FIG. 8 after the Wi-Fi connection is established. In case (a) of FIG. 8, digital camera 100 acts as an AP. Case (b) of FIG. 6 before the Wi-Fi connection transitions to case (b) of FIG. 8 after the Wi-Fi connection is established. In case (b) of FIG. 8, digital camera 100 is connected to wireless AP 300 which is identical to the wireless AP to which smartphone 200 connects. Case (c) of FIG. 6 before the Wi-Fi connection transitions to case (c) of FIG. 8 after the Wi-Fi connection is established. In case (c) of FIG. 8, digital camera 100 is connected to smartphone 200 which acts as an AP. Note that in a case (b) of FIG. 8, when digital camera 100 establishes Wi-Fi communication with smartphone 200, communication is executed not directly but via wireless AP 300.

A conventional digital camera adopting a remote activation system using BT communication, the digital camera acts as an access point and can perform Wi-Fi communication with a smartphone. Therefore, in a case where the smartphone performs the Wi-Fi communication with the digital camera, the smartphone can perform the Wi-Fi communication only with the digital camera, but cannot communicate through the Internet via a wireless access point, for example. In addition, in a case where the smartphone operates in a so-called tethering mode, since the smartphone is set as an access point, the smartphone cannot perform the Wi-Fi communication with the digital camera. In the present exemplary embodiment, smartphone 200 can cause digital camera 100 to set a required network configuration even if the remote activation system is used. That is, digital camera 100 can be set as either an access point or a station according to various communication modes of smartphone 200. Therefore, as in case (b) of FIG. 8, smartphone 200 can communicate through the Internet via wireless access point (wireless AP) 300 in a state where smartphone 200 performs the Wi-Fi communication with digital camera 100 via wireless AP 300. Alternatively, smartphone 200 can perform the Wi-Fi communication with digital camera 100 even when smartphone 200 operates in the tethering mode.

3. Summary

As described above, the information apparatus (smartphone 200) includes controller 225 (connection-information creation unit) and a communication unit (Bluetooth module 240). Controller 225 creates connection information according to a communication mode of smartphone 200. The communication unit transmits the connection information to a communication apparatus (digital camera 100) via first communication (BT-LE communication). The above connection information includes connection ID (SSID) necessary for establishing second communication (Wi-Fi communication), and connection-mode information necessary for causing digital camera 100 to set a network configuration.

Thus, smartphone 200 can cause digital camera 100 to set a required network configuration.

Similarly, the communication apparatus (digital camera 100) includes a communication unit (Bluetooth module 160) and controller 135. The communication unit receives connection information from the information apparatus (smartphone 200) via the first communication (BT-LE communication). Controller 135 starts the second communication (Wi-Fi communication) with smartphone 200 according to the connection information received by the communication unit. The above connection information includes connection ID (SSID) necessary for establishing Wi-Fi communication, and connection-mode information necessary for causing digital camera 100 to set a network configuration.

Thus, digital camera 100 can set a network configuration that smartphone 200 requires, in digital camera 100.

A communication method for the communication apparatus (digital camera 100) is a communication method for the communication apparatus capable of communicating with the information apparatus (smartphone 200) via the first communication (BT-LE communication) and the second communication (Wi-Fi communication). In the communication method for the communication apparatus, the communication apparatus is activated when the communication apparatus receives an activation signal from the information apparatus via the first communication. The communication apparatus selects whether the communication apparatus acts as an access point or a station, and performs the second communication with the information apparatus.

Thus, digital camera 100 can set a network configuration that smartphone 200 requires, in digital camera 100.

Other Exemplary Embodiments

As described above, the first exemplary embodiment has been described to exemplify a technique disclosed in the present application. However, techniques in the present disclosure is not limited to this, and can also be applied to an exemplary embodiment in which modification, replacement, addition, omission, or the like is performed. In addition, it is possible to make a new exemplary embodiment by combining constituents described in the above first exemplary embodiment.

Therefore, other exemplary embodiments will be exemplified hereinafter.

Figure 6:
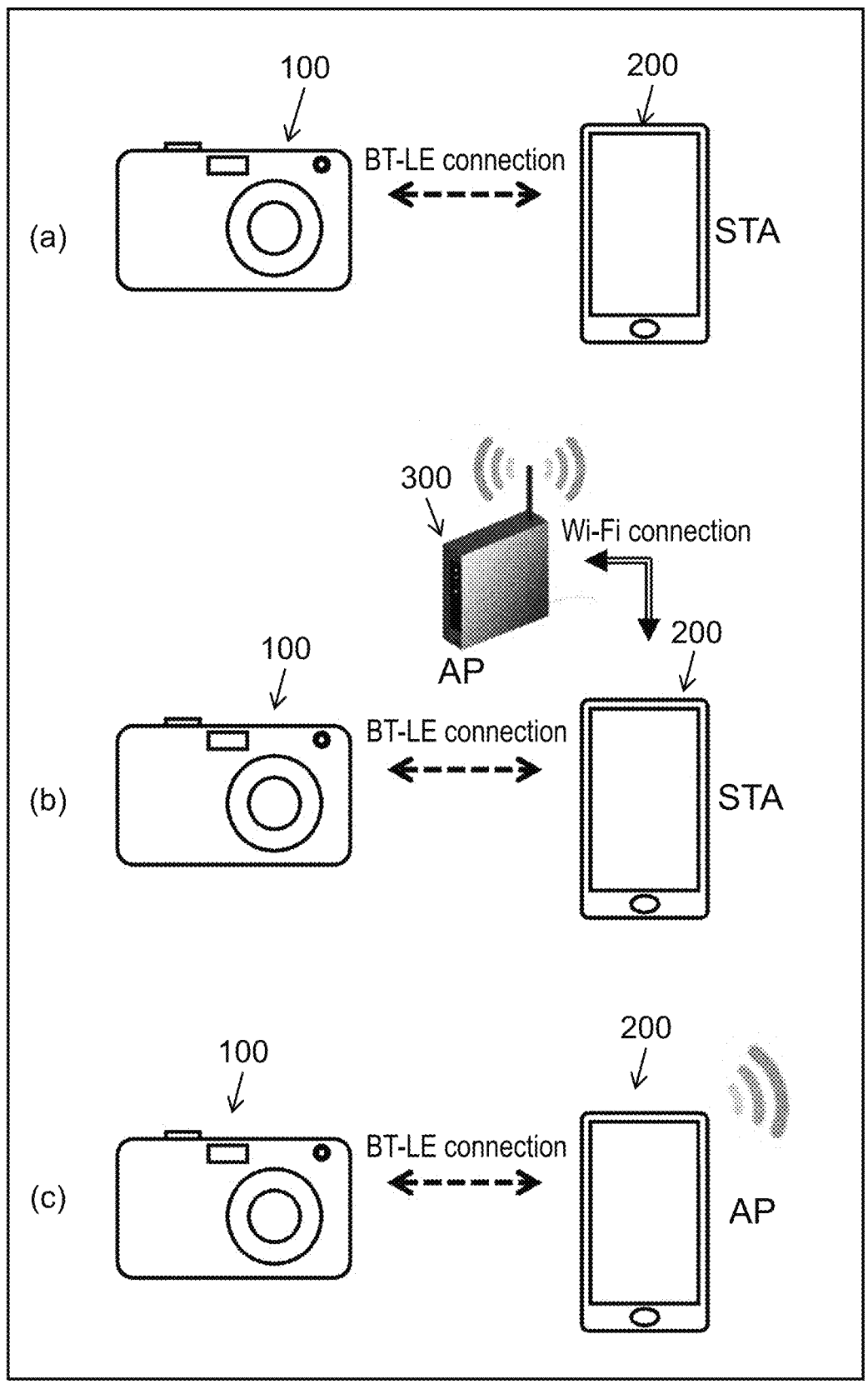
FIG. 6 is a diagram illustrating a network configuration before the digital camera wakes up.

In the first exemplary embodiment, even in a case where smartphone 200 acts as an AP (that is, in a case of the above case (c) of FIG. 6), communication control app 226 of smartphone 200 may not be able to detect that smartphone 200 acts as an AP. Alternatively, depending on a type of an operating system (OS), in a case where smartphone 200 has already established the Wi-Fi connection with another device acting as an STA in a state where smartphone 200 is in the tethering mode, smartphone 200 may not be able to additionally establish the Wi-Fi connection with yet another STA. In such a case, smartphone 200 transmits connection-mode information indicating that digital camera 100 is set as an AP. That is, even in a case where smartphone 200 acts as an AP, smartphone 200 is connected to digital camera 100 in a mode of case (a) of FIG. 8 where digital camera 100 acts as an AP.

In addition, in the first exemplary embodiment, in a case where it is determined in step S52 in FIG. 5 that no other device is set as an AP (No in step S52), smartphone 200 is set as an STA and digital camera 100 is set as an AP as illustrated in case (a) of FIG. 8. However, smartphone 200 may be set as an AP and digital camera 100 may be set as a STA. As illustrated in case (a) of FIG. 8, in a case where smartphone 200 is set as a STA, a plurality of smartphones 200 can perform the Wi-Fi communication with digital camera 100, which is useful for various applications. That is, smartphone 200 acting as an STA is useful for associating the plurality of smartphones 200 with digital camera 100. Assume that a group photo is taken. In this case, by setting digital camera 100 as an AP and smartphones possessed by a plurality of persons as STAs, the plurality of persons can simultaneously obtain photos. However, in a special application, for example, where a plurality of digital cameras 100 communicates with smartphone 200, smartphone 200 may be set as an AP and the digital cameras 100 may be set as STAs.

In addition, in the first exemplary embodiment, in order to omit input of a WPA key upon the Wi-Fi connection, the Wi-Fi connection is established beforehand to store the WPA key. In the above case (b) of FIG. 6, in a case where digital camera 100 has never been connected to wireless AP 300 to which smartphone 200 is connected, if the Wi-Fi connection between smartphone 200 and digital camera 100 was established beforehand, digital camera 100 is connected to smartphone 200 in the mode illustrated in case (a) of FIG. 8 where digital camera 100 acts as an AP. Note that smartphone 200 can transmit the WPA key via BT-LE if smartphone 200 can obtain the WPA key managed by the OS. That is, depending on an OS type of smartphone 200, the WPA key can be transmitted and received via the first communication (BT-LE). Therefore, depending on a type of smartphone 200, digital camera 100 may establish the Wi-Fi connection using wireless AP 300 as an access point even if digital camera 100 was not connected to wireless AP 300 beforehand. Alternatively, depending on the type of smartphone 200, digital camera 100 may establish the Wi-Fi connection using smartphone 200 as an access point even if digital camera 100 was not connected to smartphone 200 beforehand.

In the first exemplary embodiment, smartphone 200 is used as the information apparatus and digital camera 100 is used as the communication apparatus. However, the information apparatus and the communication apparatus may be another electronic device as long as the electronic device includes a plurality of types of communication schemes (for example, the BT-LE communication, and the Wi-Fi communication). Examples of the other electronic device include a personal computer (PC) and a tablet terminal. In addition, in the first exemplary embodiment, a digital camera is described as an example of the communication apparatus; however, the communication apparatus may be a drive recorder, a household appliance, another mobile terminal, an electronic device mounting an IOT (Internet of Things), or the like. Examples of the household appliance include a refrigerator, a microwave oven, an air conditioner, and the like. In addition, examples of the other mobile terminal include a mobile terminal which obtains vital signs such as heart rate, breathing rate, blood pressure, body temperature, or the like. Among the above communication apparatuses, a communication apparatus satisfying following conditions is more suitable as the communication apparatus according to the first exemplary embodiment. The conditions are: the communication apparatus is a mobile terminal, which is not fixed; a size of data transmitted and received between the communication apparatus and the information apparatus is relatively large; a distance between the communication apparatus and the information apparatus is within a range where an activation signal can be transmitted and received; and the like.

In the first exemplary embodiment, an activation signal is transmitted and received between the information apparatus and the communication apparatus through the BT-LE communication; however, the communication scheme is not limited to the BT-LE communication. Alternative communication scheme may be Bluetooth, near field communication (NFC), or the like, as long as the communication scheme is provided in the information apparatus and the communication apparatus. That is, the communication unit of the information apparatus may be a wireless communication module other than Bluetooth module 240. The communication unit of the communication apparatus may be a wireless communication module other than Bluetooth module 160.

The present disclosure is applicable to an information apparatus which causes a communication counterpart to set a required network configuration. Specifically, the present disclosure is applicable to a PC, a tablet terminal, and the like.

What is claimed is:

1. An information apparatus capable of communicating with a communication apparatus via first communication and second communication,
the information apparatus comprising:
a controller that creates connection-mode information according to a communication mode of the information apparatus, the connection-mode information necessary for causing the communication apparatus to set a network configuration via the second communication; and
a communication unit that transmits the connection-mode information to the communication apparatus via the first communication
wherein the connection-mode information is information for setting the communication apparatus as an access point or information for setting the communication apparatus as a station, the communication mode of the information apparatus indicates whether the information apparatus is set as an access point or as a station at the time, the controller creates the information for setting the communication apparatus as an access point or as a station, as the connection-mode information, in case that the information apparatus is set as the access point, and creates the information for setting the communication apparatus as an access point or as a station, as the connection-mode information, in case that the information apparatus is set as the station, and the communication unit transmits to the communication apparatus, in addition to the connection-mode information, a connection ID necessary for establishing the second communication with the communication apparatus.

2. The information apparatus according to claim 1, wherein the communication unit transmits an activation signal which activates the communication apparatus to the communication apparatus via the first communication.

3. A communication apparatus capable of communicating with an information apparatus via first communication and second communication, the communication apparatus comprising:

a communication unit that receives connection-mode information from the information apparatus via the first communication, the connection-mode information necessary for setting a network configuration via the second communication; and a controller that starts the second communication with the information apparatus according to the connection-mode information that the communication unit receives wherein the connection-mode information is information which sets the communication apparatus as an access point or information which sets the communication apparatus as a station, the communication unit receives the information for setting the communication apparatus as an access point or as a station, as the connection-mode information, in case that the information apparatus is set as the access point, and receives the information for setting the communication apparatus as an access point or as a station, as the connection-mode information, in case that the information apparatus is set as the station, and the communication unit receives from the information apparatus, in addition to the connection-mode information, a connection ID necessary for establishing the second communication with the information apparatus.

4. The communication apparatus according to claim 3, wherein the communication unit receives an activation signal which activates the communication apparatus from the information apparatus via the first communication.

5. A communication method for a communication apparatus capable of communicating with an information apparatus via first communication and second communication, the communication method comprising:

activating the communication apparatus when the communication apparatus receives an activation signal from the information apparatus via the first communication;

causing the communication apparatus to select as a network configuration for the second communication to act as one of an access point and a station and to perform the second communication with the information apparatus by transmitting to the communication apparatus from the information apparatus via the first communication a) connection-mode information necessary for setting the network configuration for the second communication and b) a connection ID necessary for establishing the second communication, the connection-mode information is information which indicates that the communication apparatus acts as an access point or information which indicates that the communication apparatus acts as a station; and receiving the information for setting the communication apparatus as an access point or as a station, as the connection-mode information, in case that the information apparatus is set as the access point, and receiving the information for setting the communication apparatus as an access point or as a station, as the connection-mode information, in case that the information apparatus is set as the station.

6. The communication method for the communication apparatus according to claim 5, wherein the communication apparatus selects to act as the station in a case where there is an access point other than the communication apparatus, the access point able to communicate with the information apparatus, selects to act as the access point in a case where there is no access point other than the communication apparatus, the access point able to communicate with the information apparatus, and performs the second communication with the information apparatus.

7. An information apparatus capable of communicating with a communication apparatus via first communication and second communication, the information apparatus comprising:

a controller that creates connection-mode information according to a communication mode of the information apparatus, the connection-mode information necessary for causing the communication apparatus to set a network configuration via the second communication; and a communication unit that transmits the connection-mode information to the communication apparatus via the first communication;

wherein the connection-mode information is information which indicates that the communication apparatus acts as an access point or information which indicates that the communication apparatus acts as a station, the controller creates the information for setting the communication apparatus as an access point or as a station, as the connection-mode information, in case that the information apparatus is set as the access point, and creates the information for setting the communication apparatus as an access point or as a station, as the connection-mode information, in case that the information apparatus is set as the station, and the communication unit transmits to the communication apparatus, in addition to the connection-mode information, a connection ID necessary for establishing the second communication with the communication apparatus.

8. The information apparatus according to claim 7, wherein the communication unit transmits an activation signal which activates the communication apparatus to the communication apparatus via the first communication.

\* \* \* \* \*